United States Patent [19]

Michels et al.

[11] Patent Number: 5,753,569
[45] Date of Patent: May 19, 1998

[54] SUBSTRATES WHICH HAVE BEEN PROVIDED WITH AN OIL-, WATER- AND SOIL-REPELLANT TREATMENT AND FLUORINE-CONTAINING COMPOSITIONS FOR THIS PURPOSE

[75] Inventors: Gisbert Michels, Köln; Hans-Albert Ehlert, Leverkusen; Uwe Zweering, Düsseldorf, all of Germany

[73] Assignee: Bayer Aktiengesellschaft, Leverkusen, Germany

[21] Appl. No.: 560,417

[22] Filed: Nov. 17, 1995

[30] Foreign Application Priority Data

Nov. 25, 1994 [DE] Germany .................. 44 41 982.1

[51] Int. Cl.$^6$ ..................................... B03D 3/00
[52] U.S. Cl. ........................... 442/88; 442/92; 442/94
[58] Field of Search ......................... 442/88, 94, 92

[56] References Cited

U.S. PATENT DOCUMENTS

| | | |
|---|---|---|
| 2,398,569 | 4/1946 | Widmer . |
| 3,916,053 | 10/1975 | Sherman et al. . |
| 4,043,964 | 8/1977 | Sherman et al. . |
| 4,340,749 | 7/1982 | Patel . |
| 4,351,736 | 9/1982 | Steinberger et al. . |
| 4,781,844 | 11/1988 | Kortmann et al. . |
| 4,997,893 | 3/1991 | Süling et al. . |
| 5,247,008 | 9/1993 | Michels et al. . |
| 5,387,640 | 2/1995 | Michels et al. . |

FOREIGN PATENT DOCUMENTS

| | | |
|---|---|---|
| 0312964 | 4/1989 | European Pat. Off. . |
| 0552630 | 7/1993 | European Pat. Off. . |
| 0554667 | 8/1993 | European Pat. Off. . |
| 1594985 | 8/1969 | Germany . |
| 2149292 | 4/1972 | Germany . |
| 3002369 | 8/1980 | Germany . |
| 3004824 | 8/1981 | Germany . |
| 3307420 | 9/1984 | Germany . |
| 3800845 | 7/1989 | Germany . |

OTHER PUBLICATIONS

Chemical Abstracts, abstract No. 22867y, p. 2198, abstract of FR 1,459,519, (1967).

*Primary Examiner*—James J. Bell
*Attorney, Agent, or Firm*—Sprung Kramer Schaefer & Briscoe

[57] ABSTRACT

Substrates which have been provided with an oil-, water- and soil-repellant treatment from the group consisting of naturally occurring and synthetic textiles and their mixtures, leather, mineral substances, thermoplastic and thermosetting polymers and paper, comprise fluorine-containing compositions which comprise two components A and B.

Component A is a fluorine-containing acrylic copolymer with the following comonomers:
a) (meth)acrylates containing perfluoroalkyl groups $$C_nF_{2n+1}-X-O-CO-CR^1=CH_2 \quad (I),$$

b) monomers from the group consisting of styrene, acrylonitrile, vinyl acetate, vinyl propionate and monomers, $$CH_2=CR^4-CO-OR^5 \quad (II),$$

c) monomers $$CH_2=CR^6COO-(CH-CH_2O)_pR^8 \quad (III)$$
$$\phantom{CH_2=CR^6COO-(}|\phantom{CH-CH_2O)_pR^8}$$
$$\phantom{CH_2=CR^6COO-(}R^7$$

and
d) monomers $$CH_2=CR^{11}COO-CH_2CH_2N(R^9, R^{10}) \quad (IVa)$$

or in quaternized form $$[CH_2=CR^{11}-COO-CH_2CH_2N(R^9R^{10}R^{12})]^{\oplus}Y^{\ominus} \quad (IVb)$$

or in N-oxidized form $$CH_2=CR^{11}-COO-CH_2CH_2-N(R^9, R^{10}) \quad (IVc)$$
$$\phantom{CH_2=CR^{11}-COO-CH_2CH_2-N(R^9}\downarrow$$
$$\phantom{CH_2=CR^{11}-COO-CH_2CH_2-N(R^9}O$$

or of the formula $$CH_2=CR^{13}-COO^{\oplus}Z^{\ominus} \quad (V)$$

Component B is a fluorine-free poly(meth)acrylate of comonomers $$CH_2=CHR^{14}-COO-R^{15} \quad (VI)$$

0 to 20% by weight of comonomer (VI) can be replaced by comonomers from the group consisting of vinyl acetate, styrene, acrylonitrile, hydroxyethyl (meth)acrylate, hydroxypropyl (meth)acrylate, glycidyl (meth)acrylate, (meth)acrylamide, N-methylol-(meth) acrylamide and N-methoxymethylol(meth)acrylamide.

The weight ratio of A to B is 1:25 to 10:1.

Substituents and indices are mentioned in the description.

13 Claims, No Drawings

SUBSTRATES WHICH HAVE BEEN PROVIDED WITH AN OIL-, WATER- AND SOIL-REPELLANT TREATMENT AND FLUORINE-CONTAINING COMPOSITIONS FOR THIS PURPOSE

BACKGROUND OF THE INVENTION

1. Field of the Invention

The present invention relates to substrates, in particular home textiles, which have been given an oil-, water- and soil-repellant treatment, and to fluorine-containing compositions for this purpose.

Many substrates, in particular home textiles, for example carpets, acquire oil- , water- and soil-repellant properties by treating, for example, the pile of a carpet with fluorocarbon compounds.

2. Description of the Related Art

According to the literature, particularly good effects are to be obtained by mixtures of fluorocarbon compounds with various fluorine-free substances. DE-A 3 307 420 discloses a mixture of fluorocarbon compounds and organosilsesquioxanes which are employed for carpet treatment. DE-A 2 149 292 and DE-C 3 002 369 disclose a mixture of water-insoluble fluorocarbon compounds, which, for example, can be in the form of ester or urethane, and water-insoluble polymers which are free from fluorine in the non-vinyl position and have main transition temperatures above 45° C. or 25° C., respectively. Main transition temperatures are melting points or glass transition temperatures. According to DE-A 2 149 292 and DE-C 3 002 369, preferred water-insoluble polymers having a glass transition temperature above 45° C. are, for example, polymethyl methacrylate or poly(methyl methacrylate-co-ethyl methacrylate). It is emphasized here that the compositions for prevention of embedding of dirt should be neither tacky nor rubbery. Common disadvantages of the treatment compositions mentioned are that large amounts of the fluorocarbon-containing compositions, based on the carpet fibre weight, must be employed to achieve good oil-, water- and soil-repellant properties. It is also a disadvantage of the abovementioned treatment compositions that the water-repellant properties of the treated textile floor coverings are not adequate for increased requirements (for example water/isopropanol repellancies greater than 50/50 cf. embodiment examples), even when large amounts are employed. Another disadvantage is that after the treatment with the abovementioned fluorine-containing treatment agents, the textile floor coverings must be heated to at least 70° C., but usually to 100° to 130° C., to acquire the desired effects. However, heat treatments at elevated temperature are expensive and are therefore undesirable, and are sometimes harmful to certain carpet constructions. The treatment compositions according to DE-A 2 149 292 and DE-C 3 002 369 furthermore have the disadvantage that only certain treatment methods produce satisfactory results. However, the treatment method used depends on the treatment plant available and thus cannot be determined beforehand.

EP 552 630 and EP 554 667 furthermore disclose treatment compositions for various substrates which are based only on fluorine-containing copolymers and therefore require higher deposits of the expensive fluorine components on the substrates.

SUMMARY OF THE INVENTION

The invention is therefore based on the object of providing substrates which have been provided with an oil-, water- and soil-repellant treatment and to compositions for their oil-, water- and soil-repellant treatment, in particular for the treatment of home textiles, which achieve good effects with significantly smaller amounts of the expensive fluorocarbon compounds, based on the substrate weight. The compositions according to the invention should furthermore impart to the substrates, in particular the home textiles, water-repellant actions which meet increased requirements. Another object comprises providing treatment compositions with which the heat treatment can be carried out at the lowest temperature or, preferably, no heat treatment is necessary. It is also desirable for the treatment agent to give good results by all the customary and known treatment methods.

It has now been found, surprisingly, that aqueous dispersions whose constituents other than water are mixtures of fluorine-containing acrylic polymers (component A) and fluorine-free poly(meth)acrylates (component B) are suitable compositions for oil-, water- and soil-repellant treatment of substrates, in particular home textiles, and solve the abovementioned problems. It has furthermore been found that all the customary treatment methods are suitable for imparting good oil-, water- and soil-repellant properties to substrates, in particular home textiles, if the substrates are treated with the compositions according to the invention. This is surprising, since the components A used for the present invention have a glass transition temperature below 25° C. and are in rubbery and in some cases tacky form at room temperature.

The invention relates to substrates from the group consisting of naturally occuring and synthetic textiles and their mixtures, leather, mineral substances, thermoplastic and thermosetting polymers and paper, which are treated with fluorine-containing compositions of the type mentioned below in an amount of 10 to 10,000 ppm, preferably 50 to 5,000 ppm, particularly preferably 100 to 2,000 ppm, calculated as fluorine and based on the total weight of substrates provided with an oil-, water- and soil-repellant treatment.

The invention furthermore relates to compositions for oil-, water- and soil-repellant treatment of substrates, comprising two components A and B, and aqueous dispersions thereof, the constituents of which, other than water, represent 5–50% of the total weight of the dispersions and in which component A is a fluorine-containing acrylic polymer which comprises the following weight contents of comonomers, based on the total weight of A:

a) 40 to 85% by weight of (meth)acrylates containing perfluoroalkyl groups, of the formula

b) 1 to 45% by weight of one or more monomers from the group consisting of styrene, acrylonitrile, vinyl acetate, vinyl propionate and monomers of the formula

c) 4 to 30% by weight of monomers of the formula

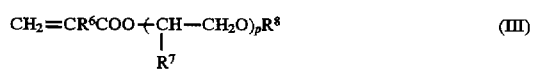

and d) 1 to 15% by weight of ionic or ionizable monomers which either contain an amine or a carboxyl function, of the formula

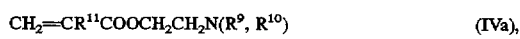

or are in quaternized form, of the formula $$[CH_2=CR^{11}-COO-CH_2CH_2N(R^9R^{10}R_{12})]^{\oplus}Y^{\ominus} \quad (IVb)$$

or are in N-oxidized form, of the formula $$CH_2=CR^{11}-COO-CH_2CH_2-N(R^9, R^{10}) \quad (IVc)$$
$$\downarrow$$
$$O$$

or of the formula $$CH_2CR^{13}-COO^{\ominus}Z^{\oplus} \quad (V),$$

wherein, in the formulae, n represents a number from 4 to 20, preferably 6 to 16, or a mixture of two or more of these numbers, X represents —(—CH$_2$—)m—, —SO$_2$—NR$^2$—CH$_2$—CHR$^3$— or —O—(—CH$_2$—)$_m$—, wherein m denotes a number from 1 to 4, preferably 2, $R^1$, $R^3$, $R^4$, $R^6$, $R^7$, $R^{11}$ and $R^{13}$ independently of one another represent hydrogen or methyl, $R^2$, $R^9$, $R^{10}$ and $R^{12}$ independently of one another denote $C_1$–$C_4$-alkyl, $R^5$ represents $C_1$–$C_{22}$-alkyl, $R^8$ denotes hydrogen or $C_1$–$C_8$-alkyl, p represents a number from 1 to 50, or represents a mixture of two or more numbers, $Y^{\ominus}$ represents one equivalent of a mono- to trivalent anion and $Z^{\oplus}$ denotes the proton $H^{\oplus}$ or one equivalent of a monovalent cation;

and component B is a fluorine-free poly(meth)acrylate of one or more comonomers of the formula $$CH_2=CHR^{14}-COO-R^{15} \quad (VI)$$

or polyacrylonitrile with 0 to 20% by weight of comonomer (VI), in which $R^{14}$ denotes hydrogen or methyl and $R^{15}$ represents $C_1$–$C_{22}$-alkyl, it being possible for 0 to 20% by weight of the comonomer of the formula (VI) to be replaced by one or more comonomers from the group consisting of vinyl acetate, styrene, acrylonitrile, hydroxyethyl (meth)acrylate, hydroxypropyl (meth)acrylate, glycidyl (meth)acrylate, (meth)acrylamide, N-methylol(meth)acrylamide and N-methoxymethylol (meth)acrylamide, and the weight ratio of component A to component B being in the range from 1:25 to 10:1, preferably from 1:1 to 5:1.

DETAILED DESCRIPTION OF THE INVENTION

Preferably, n in monomers of the formula (I) assumes values from 6 to 16 and, also preferably, m assumes the value 2. $R^1$ in monomers of the formula (I) is preferably hydrogen. The perfluoroalkyl radical (—$C_nF_{2n+1}$) can be unbranched or branched.

Preferably, in monomers of the formula (II), $R^1$ denotes methyl, ethyl, propyl, butyl, hexyl or octyl, stearyl or behenyl.

Preferably, in monomers of the formula (III), $R^7$ denotes hydrogen and the index p denotes a number from 3 to 25.

Preferably, in monomers of the formula (IVa, b, c), $R^9$ and $R^{10}$ denote methyl. Preferred anions $Y^{\ominus}$ are chloride, acetate, ½ sulphate, $C_1$–$C_{12}$-aryl- or alkylsulphonate or ⅓ phosphate. Chloride, acetate and ⅓ phosphate are particularly preferred.

Mixtures of two or more substances falling under the formulae (I), (II), (III) and (IVa, b, c) or (V) can also be employed in the fluorine-containing acrylic polymers.

In addition to the monomers a), b) and c) in the above-mentioned amounts, a preferred fluorine-containing acrylic polymer (component A) comprises, as monomer d), 1–15% by weight of those of the formula (V).

Preferred monomers (I), (II) and (III) have the meanings given above. In the monomer (V), $Z^{\oplus}$ preferably denotes $Na^{\oplus}$, $K^{\oplus}$, $NH_4^{\oplus}$, $H_2N^{\oplus}$ $(CH_2CH_2OH)_2$, $H_3N^{\oplus}$ $CH_2CHOH$ or several of these which give one equivalent as the total. Component A comprises comonomers of either the formula (IVa, b, c) or (V). Preferably, component A of the composition according to the invention comprises comonomers of the formula (IVa, b, c).

A preparation process for component A, which is stabilized cationically by incorporation of the monomer (IV a, b, c) is described in U.S. Pat. No. 5,247,008 and comprises joint polymerization, initiated by free radicals, for example in solution or suspension, and subsequent neutralization with acid. The preparation process for component A, which is stabilized anionically by incorporation of the monomer (V), is in principle carried out in the same manner. If the monomer (V) is used and the proton $H^{\oplus}$ is present as $Z^{\oplus}$, however, neutralization is carried out with a base, preferably with sodium hydroxide solution, potassium hydroxide solution, aqueous ammonia, diethanolamine or monoethanolamine.

The poly(meth)acrylates (component B) preferably comprise the following comonomers of the formula (VII), it also being possible for mixtures of several substances falling under formula (VII) to be employed:

$$CH_2=CR^{14}COOR^{16} \quad (VII)$$

in which $R^{14}$ denotes hydrogen or methyl and $R^{16}$ denotes $C_1$–$C_4$-alkyl.

Up to 20% by weight of additional monomers, such as, for example, vinyl acetate, styrene, acrylonitrile, hydroxyethyl (meth)acrylate, hydroxypropyl (meth)acrylate, glycidyl (meth)acrylate, (meth)acrylamide, N-methylol(meth) acrylamide or N-methoxymethylol(meth)acrylamide, can be incorporated into the poly(meth)acrylate of component B. A preparation process such as is described in U.S. Pat. No. 4,043,964 and DE 3,002,369 is suitable for component B.

The poly(meth)acrylate (VI) of component B can be replaced by polyacrylonitrile, which can comprise up to 20% by weight of comonomer (VI) and other monomers listed in the above section. In the case of component B where $R^{14}$ and $R^{15}$=methyl, the main transition temperature (glass transition temperature) is 105° C. Surprisingly, heat treatment can also be dispensed with if this component is employed, and instead the product can be dried at room temperature (25° C.) after the treatment.

The weight ratio of component A to component B in the treatment composition according to the invention is in the range from 1:25 to 10:1, preferably in the range from 1:10 to 5:1.

The invention is accordingly characterized above all by the fluorine-containing compositions with components A and B with which substrates are treated. However, in addition to the compositions according to the invention, other textile auxiliaries, which can be added even during preparation of the treatment liquor, but of course also only subsequently, can also be co-used for the treatment. Such additives which are to be mentioned are the customary creaseproofing and soft handle agents, flame retardants, oleophobizing agents, hydrophobizing agents, finishing agents, extenders for textile auxiliaries and others. It is of course also appropriate, where necessary, to co-use known hardening agents.

The following examples of such additional compositions may be mentioned: melamine condensation products such as are described, for example, in DE-A 3 800 845 and in U.S. Pat. No. 2,398,569; aqueous colloidal suspensions of organosiloxanes which are disclosed, for example, in DE-A 3 307 420.

Thus, organosilsesquioxanes such as are described, for example, in DE-B 1 594 985 or in DE-A 3 004 824 can be employed. These consist of, for example, units of the formula $RSiO_{3/2}$ (R=an optionally substituted alkyl or aryl radical having up to 7 carbon atoms) and/or of cocondensates of hydrolysates of tetraalkoxysilanes with organotrialkoxysilanes having $RSiO_{3/2}$ or $SiO_2$ units. These are prepared by a procedure in which, for example, silanes of the general formula $R—Si(OR')_3$, by themselves or together with silanes $Si(OR_{40})_4$, wherein R is a substituted or unsubstituted hydrocarbon radical having 1 to 7 carbon atoms, the substituents of which can be halogen atoms or amino, mercapto and epoxide groups, and up to 95% of the radicals R are methyl, and R' denotes an alkyl radical having 1 to 4 carbon atoms, are added to a mixture of water, a buffer substance, a surface-active agent and if appropriate an organic solvent, with agitation and under acid or basic conditions.

The compositions according to the invention represent an improvement in the treatment of substrates, in particular home textiles, over the compositions described in DE 3 307 420, DE 2 149 292 and DE 3 002 369. Compared with compositions known from EP 552 630 and EP 554 667, the compositions according to the invention represent a considerable reduction in cost owing to the co-use of component B.

All processes which are suitable for imparting to substrates, in particular home textiles, good oil-, water- and soil-repellant properties are characterized by use of the compositions according to the invention. The base substrates on which the substrates treated according to the invention are based are, for example: linen, cotton, wool, silk, jute, polyamide, polyester, polyacrylonitrile and mixtures thereof, leather, stone slabs, floor tiles, glazed tiles, roof tiles, glass, ground surfaces of silicon, foils and films and compact workpieces of polyolefins, polyesters, polyamides, polycarbonates, polyurethanes, polyacetals, polyethers, polysulphides, polysulphones, polyimides and other thermoplastics, as well as of phenol/formaldehyde resins, urea/formaldehyde resins, melamine/formaldehyde resins and other thermosetting resins, paper and paper-like materials, such as paperboard. Preferred base substrates are home textiles based on naturally occurring and synthetic textiles and their mixtures, which are employed, for example, as carpets, curtains, decorative materials or coverings for upholstered furniture.

Processes for the treatment of such base substrates and therefore for application of the fluorine-containing compositions according to the invention are known to the expert and are, for example, dipping or spraying of the base substrates; the compositions according to the invention furthermore can be employed during the production of the base substrates, for example the pulp.

Textiles as base substrates, preferably home textiles, can be treated, for example, in the padding, spraying or foaming process.

The padder consists of a liquor trough (chassis) and at least one pair of rubber rolls. The textiles to be treated are impregnated with the treatment liquor in the chassis and squeezed off between the rolls; the superfluous liquor runs back into the chassis. It is very important that a uniform liquor pick-up is achieved over the entire width of the goods during squeezing-off. In the padding process, the liquor pick-up is stated in % of the weight of goods, and for normal textile constructions can be between 30 and 300%, depending on the quality of the goods and the padder pressure used.

In the spraying process, the textile is sprayed with the treatment liquor. The treatment liquor is finely divided by nozzles and applied uniformly. An amount of treatment liquor precisely defined beforehand is applied to one square metre of textile goods.

In the foaming process, the treatment liquor is continuously foamed mechanically in a commercially available mixer by addition of a foaming agent. The foam is produced in the mixing head by mixing the liquor with air. The foam which emerges is conveyed via a foam line to a discharge slot. The goods are pressed against the slot and taken off via a separate unit, for example a stenter frame. In the following examples, a long-chain amine oxide (Baygard® Foamer from Bayer AG) was employed as the foaming agent in a concentration of 3 g/l of treatment liquor and the degree of foaming was adjusted to 1:33. The experiments were carried out on the Küsters Foam Applicator (=KFA unit), Küsters, Krefeld.

After the treatment, the textiles, preferably home textiles, are dried, it being possible to use temperatures of 120° to 150° C. to achieve the desired treatment effect according to the known procedure. However, good oil-, water- and soil-repellant treatments can also be obtained with the new compositions according to the invention at significantly lower drying temperatures, for example at 25° C.

Samples of the materials thus pretreated were taken for testing of the following effects:

Oil-repellancy (according to AATCC 118-1972): The test sample is placed on a horizontal, smooth surface, a small drop (drop diameter about 5 mm) of the test liquids is applied to the test sample with the aid of a dropping pipette, and the sample is evaluated as specified after in each case 30 seconds. The AATCC oil-repellancy level of a test fabric is the highest number of that test liquid which does not wet or penetrate into the test material within a time span of 30 seconds. The test liquids and mixtures for the test method are: No. 1: Nujol or paraffin oil DAB 8; No. 2: 65% by volume of Nujol and 35% by volume of n-hexadecane; No. 3: n-hexadecane; No. 4: n-tetradecane; No. 5: n-dodecane; No. 6: n-decane; No. 7: n-octane; No. 8: n-heptane.

Repellancy towards a water/alcohol mixture (hydrophobicity): Drops of water/isopropanol mixtures (ratio 90/10 to 10/90) are applied to the test sample. The test result corresponds to the mixture with the highest isopropanol content which remains on the test sample in unchanged form for at least 20 seconds (the value 80/20, for example, is better than 20/80).

Soil repellancy (laboratory soiling test in accordance with DIN 54 324, chair castor test): Samples of the treated carpet goods were taken in accordance with the DIN specifications and soiled with 10 g of a synthetic soil. The samples were loaded in accordance with the chair castor test, which is described in detail in DIN 54 324, under a castor loading of 60 kg in total and with a change in castor pressure direction after every 50 revolutions. The test specimens are vacuumed with a vacuum cleaner (1000 watt) once with and once against the pile and evaluated visually. Test ratings are stated, higher numbers indicating an improved soil repellancy. The synthetic soil is prepared as follows:

1 932 g of chamotte 40 g of iron oxide black 20 g of iron oxide yellow 8 g of carbon black 1 000 g of water After treatment in a porcelain bead mill for 40 hours, the above mixture is dried, comminuted coarsely, ground in a powder mill and finally sieved by means of a sieving machine through a sieve having a mesh width of 10 μm.

EXAMPLES

Compositions which are not according to the invention and which represent the prior art (cf. above) are the following:

Scotchgard® FC 396 (3M Comp.) according to DE-A 2 149 292

Baygard® SF-A (Bayer AG) according to DE-A 3 307 420

The compositions according to the invention are aqueous dispersions, the contents of which comprise a mixture of one or more fluorine-containing acrylate polymers (component A) and one or more poly(meth)acrylates (component B).

Example A1 and A2: Preparation of the Fluorine-Containing Acrylate Polymers (Component A)

Example A1

A solution of 62.0 parts by weight of $CH_2=CHCOOCH_2CH_2C_nF_{2n+1}$ (mixture where n=6, 8, 10, 12, 14 or 16)

15.0 parts by weight of n-butyl acrylate,

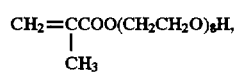

was prepared in a reactor with a thermometer, stirrer and reflux condenser.

The solution was first stirred at room temperature in a nitrogen atmosphere, 2.25 parts by weight of tert-butyl perpivalate (75% strength) were then added and the mixture was kept at 73° C. under the autogenous pressure for 8 hours. After this time, the polymerization had ended. A solution of 3.9 parts by weight of acetic acid in 296.0 parts by weight of deionized water was added to the polymer solution, which had been cooled to 50° C., at 50° C. in the course of 15 minutes. The mixture was stirred for 15 minutes and the acetone was then removed by distillation at 60° C./200–300 mbar. A stable polymer dispersion having a solids content of 25% by weight was obtained. The glass transition temperature of the polymer was −60° C. (DSC).

Example A2

A polymer based on the following monomer mixture was prepared in the same manner as in Example A1; the glass transition temperature of the polymer is −44° C. (DSC).

70.0 parts by weight of $CH_2=C(CH_3)COOCH_2CH_2C_nF_{2n+1}$ (mixture where n=6, 8, 10, 12, 14 or 16)

12.0 parts by weight of methyl methacrylate, 15.0 parts by weight of $CH_2=CHCOO(CH_2CH_2O)_8H$, 3.0 parts by weight of dimethylaminoethyl methacrylate.

Example B: Preparation of a Polymethacrylate (Component B)

An aqueous polymethyl methacrylate dispersion was prepared as described in DE 2 149 292, Example 8, but with the difference that the solids content was adjusted to 30% by weight.

Examples 1 to 3: Preparation of a Polymethacrylate (Component B)

The compositions according to the invention were obtained by mixing components A2 and B as aqueous dispersions. The mixing ratios are given in the following table:

| Example | Component A2 (parts by weight) | Component B (parts by weight) |
|---------|-------------------------------|-------------------------------|
| 1       | 75                            | 25                            |
| 2       | 60                            | 40                            |
| 3       | 40                            | 60                            |

EXAMPLES I, II AND III

Use of the compositions according to the invention

Example I

The base substrate to be treated was a carpet (polyamide velour) having a pile weight of 600 g/m². The compositions according to the invention were applied by the padding process. The treatment liquor was prepared by diluting the products according to Examples 1 to 3 with water such that, at a liquor pick-up of 100%, a fluorine deposit of 300 or 600 ppm was achieved on the carpet, based on the total weight of the carpet.

Example II

The base substrate to be treated was a carpet having a pile weight of 600 g/m². The compositions according to the invention were applied by the spraying process. The treatment compositions were prepared by diluting the products according to Examples 1 to 3 with water such that, when 200 ml of liquor were sprayed onto 1 m² of carpet, a fluorine deposit of 300 ppm or 600 ppm was achieved on the carpet.

Example III

The base substrate to be treated was a carpet having a pile weight of 600 g/m². The compositions according to the invention were applied by the foaming process. The treatment liquor was prepared by diluting the products according to Examples 1 to 3 with water such that, after a wet application of 30%, a fluorine deposit of 300 ppm or 600 ppm was achieved on the carpet. Baygard® Foamer was added as a foaming agent in a concentration of 3 g/l of treatment liquor; the degree of foaming is 1:33.

After the treatment according to Examples I to III, the carpet was dried at 120° C. and its oil-, water- and soil-repellant properties were tested.

For comparison, the products Scotchgard® FC 396 and Baygard® SF-A were employed in Examples 1 to 3 instead of the products according to Examples 1 to 2. The results are to be found in the following Table 1.

TABLE 1

| Product according to | Example 1 | | Example 2 | | Example 3 | | Scotchgard FC 396 | | Baygard SF-A |
|---|---|---|---|---|---|---|---|---|---|
| Fluorine deposit Example I (padding process) | 300 ppm | 600 ppm | 300 ppm | 600 ppm | 300 ppm | 600 ppm | 300 ppm | 600 ppm | 300 ppm |
| Oleophobicity | 5 | 5 | 5 | 5–6 | 5 | 5–6 | 1 | 1 | 4 |
| Hydrophobicity | 80/20 | 80/20 | 80/20 | 80/20 | 80/20 | 80/20 | 15/85 | 15/85 | 45/55 |
| Soiling | n.d. | n.d. | n.d. | n.d. | n.d. | n.d. | n.d. | n.d. | n.d. |
| Example II (spraying process) | | | | | | | | | |
| Oleophobicity | 3 | 6 | 1–2 | 2–3 | 5 | 5–6 | 3 | 4 | 3 |
| Hydrophobicity | 35/65 | 80/20 | 45/55 | 50/50 | 80/20 | 80/20 | 30/70 | 40/60 | 30/70 |
| Soiling | 2–3 | 2–3 | 2–3 | 2–3 | 2–3 | 2–3 | 3–4 | 3–4 | 3–4 |
| Example III (foaming process) | | | | | | | | | |
| Oleophobicity | 3–4 | 4–5 | 2 | 3–4 | 3–4 | 6 | 2–3 | 5 | 2 |
| Hydrophobicity | 80/20 | 80/20 | 80/20 | 80/20 | 80/20 | 80/20 | 20/80 | 40/60 | 20/80 |
| Soiling | 4 | 4 | 4 | 4 | 4 | 4 | 4 | 4 | 4 | n.d. not determined

It can be seen with the aid of Table 1 that the compositions according to the invention (Examples 1 to 3) are clearly superior to the treatment composition Scotchgard FC 396® and Baygard SF-A®. For a comparable fluorine deposit, the oil test ratings are at least equivalent, and in some cases clearly better. It was possible to improve the water-repellancy considerably, which reaches the very good rating of 80/20 in the majority of cases. It is furthermore advantageous that the compositions according to the invention have good oil-, water- and soil- repellancy properties after the usual treatment processes (padding, spraying and foaming process), while Scotchgard FC 396, for example, achieves unsuitable results after the padding process.

Examples 4 to 6

(Preparation of the compositions according to the invention)

The compositions according to the invention were obtained as an aqueous dispersion by mixing components A1 and B. The mixing ratios are shown in the following table:

| Example | Component A1 | Component B (parts by weight) |
|---|---|---|
| 4 | 56 | 44 |
| 5 | 50 | 50 |
| 6 | 40 | 60 |

Example IV

Use of the compositions according to the invention

In the same manner as in Example 1, a polyamide velour carpet was treated by using the compositions according to Examples 4 to 6 in the padding process such that a fluorine deposit of 250 ppm was achieved on the carpet. As a comparison, component A1, which is not per se according to the invention, was employed without addition of component B. After the treatment, part of the carpet was dried at 120° C. and another part at room temperature (25° C.), and the carpet was tested for its oil-, water- and soil-repellant properties (see following Table 2).

TABLE 2

| Product | Example 4 | Example 5 | Example 6 | Example A1 | Scotchgard FC 396 | Baygard SF-A |
|---|---|---|---|---|---|---|
| Fluorine deposit Example IV (padding process; drying at 120° C.) | 250 ppm | 250 ppm | 250 ppm | 250 ppm | 250 ppm | 250 ppm |
| Oleophobicity | 5 | ./. | 5 | 4 | 1 | 4 |
| Hydrophobicity | 65/35 | ./. | 50/50 | 60/40 | 15/85 | 45/55 |
| Soiling | 2–3 | ./. | 3 | 2 | n.d. | n.d. |
| Example IV (padding process; drying at 25° C.) | | | | | | |
| Oleophobicity | 5 | 5 | 5 | 4 | 0 | 0 |
| Hydrophobicity | 80/20 | 80/20 | 50/50 | 80/20 | 0/100 | 0/100 |
| Soiling | n.d. | 3 | n.d. | 2 | n.d. | n.d. | n.d not determined

Table 2 shows that the carpets treated with the compositions according to the invention do not necessarily have to be dried at 120° C., but comparable results, which are surprisingly better in the case of water-repellancy, are achieved if the treated carpets are dried at room temperature (25° C.). The fact that good results are achieved at room temperatures is surprising since the main transition temperature of component B is 105° C. An expensive and sometimes damaging heat treatment can therefore be dispensed with. At the same time, it can be seen that the compositions according to the invention, which are a mixture of fluorine-containing acrylate polymers and fluorine-free poly(meth)acrylates, give better results in respect of oleophobicity and staining than the fluorine-containing acrylate polymer (Example A1) by itself.

Example V (Use of the compositions according to the invention)

The base substrate to be treated was a polyester fabric. The compositions according to the invention were applied by the padding process. The treatment liquor was prepared by diluting the composition according to Example 5 with water such that, at a liquor pick-up of 100%, a fluorine deposit of 150 or 250 ppm was achieved on the polyester fabric.

After the treatment, the carpet was dried at room temperature (25° C.) and tested for oil-, water- and soil-repellant properties.

For comparison, the product according to Example A1, which is not per se according to the invention, was employed (see following Table 3).

Expensive and sometimes damaging heat treatments can be avoided by drying the polyester fabric at room temperature. Compared with the pure fluorocarbon (Example A1), the mixture of fluorocarbon and poly(meth)acrylate provides the advantage that, for the same fluorine deposit, less soiling of the fabric is to be detected.

TABLE 3

| Product | Example 5 | | Example A1 | |
|---|---|---|---|---|
| Fluorine deposit Example V (padding process; drying at 25° C.) | 150 ppm | 250 ppm | 150 ppm | 250 ppm |
| Oleophobicity | 5 | 5 | 4–5 | 5 |
| Hydrophobicity | 40/60 | 40/60 | 70/30 | 70/30 |
| Soiling | 3 | 3 | 2 | 2 |

What is claimed is:

1. Substrates from the group consisting of naturally occurring and synthetic textiles and their mixtures, leather, mineral substances, thermoplastic and thermosetting polymers and paper, which have been made oil-, water- and soil-repellant by application thereto of fluorine-containing compositions comprising components A and B wherein component A comprises, by total weight of A:

a) 40 to 85% by weight of (meth)acrylates containing perfluoroalkyl groups, of the formula $$C_nF_{2n+1}-X-O-CO-CR^1=CH_2 \quad (I)$$

b) 1 to 45% by weight of one or more monomers from the group consisting of styrene, acrylonitrile, vinyl acetate, vinyl propionate and monomers of the formula $$CH_2=CR^4-CO-OR^5 \quad (II),$$

c) 4 to 30% by weight of monomers of the formula $$CH_2=CR^6COO+CH-CH_2O)_pR^8 \quad (III)$$
$$\quad\quad\quad\quad\quad\quad\quad\quad |$$
$$\quad\quad\quad\quad\quad\quad\quad R^7$$

and d) 1 to 15% by weight of ionic or ionizable monomers which either contain an amine or a carboxyl function, of the formula $$CH_2=CR^{11}-COO-CH_2CH_2N(R^9, R^{10}) \quad (IVa)$$

or are in quaternized form, of the formula $$[CH_2=CR^{11}-COO-CH_2CH_2N(R^9R^{10}R^{12})]\oplus Y\ominus \quad (IVb)$$

or are in N-oxidized form, of the formula $$CH_2=CR^{11}-COO-CH_2CH_2-N(R^9, R^{10}) \quad (IVc)$$
$$\quad\quad\quad\quad\quad\quad\quad\quad\quad\quad\quad\quad\downarrow$$
$$\quad\quad\quad\quad\quad\quad\quad\quad\quad\quad\quad\quad O$$

or of the formula $$CH_2=CHR^{13}-COO\ominus Z\oplus \quad (V),$$

wherein, in the formulae, n represents a number from 4 to 20, or a mixture of two or more of these numbers, X represents $-(-CH_2-)m-$, $-SO_2-NR^2-CH_2-CHR^3-$ or $-O-(-CH_2-)m-$, wherein m denotes a number from 1 to 4, $R^1$, $R^3$, $R^4$, $R^6$, $R^7$, $R^{11}$ and $R^{13}$ independently of one another represent hydrogen or methyl, $R^2$, $R^9$, $R^{10}$ and $R^{12}$ independently of one another denote $C_1$–$C_4$-alkyl, $R^5$ represents $C_1$–$C_{22}$-alkyl, $R^8$ denotes hydrogen or $C_1$–$C_8$-alkyl, p represents a number from 1 to 50, or represents a mixture of two or more of these numbers, $Y\ominus$ represents one equivalent of a mono- to trivalent anion and $Z\oplus$ denotes the proton $H\oplus$ or one equivalent of a monovalent cation;

and component B is a fluorine-free poly(meth)acrylate of one or more comonomers of the formula $$CH_2=CHR^{14}-COO-R^{15} \quad (VI)$$

or polyacrylonitrile with 0 to 20% by weight of comonomer (VI), in which $R^{14}$ denotes hydrogen or methyl and $R^{15}$ represents $C_1$–$C_{22}$-alkyl, it being possible for 0 to 20% by weight of the comonomer of the formula (VI) to be replaced by one or more comonomers from the group consisting of vinyl acetate, styrene, acrylonitrile, hydroxyethyl (meth)acrylate, hydroxypropyl (meth)acrylate, glycidyl (meth)acrylate, (meth)acrylamide, N-methylol-(meth)acrylamide and N-methoxymethylol(meth)acrylamide, and the weight ratio of component A to component B is in the range of from 1:25 to 10:1, said fluorine-containing compositions being applied to said substrates in an amount of 10 to 10,000 ppm, calculated as fluorine and based on the total weight of the substrate.

2. The substrates of claim 1 from the group consisting of naturally occurring and synthetic home textiles and their mixtures.

3. The substrates of claim 1, provided with fluorine-containing compositions, wherein the index n represesents a number from 6 to 16 or a mixture of two or more of these numbers.

4. The substrates of claim 1, provided with fluorine-containing compositions, wherein, within the meaning of X, the index m denotes the number 2.

5. The substrates of claim 1, provided with fluorine-containing compositions wherein the components A and B are in the range from 1:10 to 5:1.

6. The substrates of claim 1, wherein $R^5$ is $C_1$–$C_4$- alkyl, hexyl, octyl, stearyl or behenyl.

7. The substrates of claim 1, wherein $R^7$ is hydrogen.

8. The substrates of claim 1, wherein the index p denotes a number from 3 to 25 or a mixture of two or more of these numbers.

9. The substrates of claim 1, wherein $R^9$ and $R^{10}$ denote methyl.

10. The substrates of claim 1, wherein, in the case that the comonomers (IV a, b, c) are employed, $Y^\ominus$ represents chloride, acetate, ½ sulphate, ⅓ phosphate or $C_1$–$C_{12}$-aryl- or alkylsulphonate.

11. The substrates of claim 1, wherein $Y^\ominus$ represents chloride, acetate or ⅓ phosphate.

12. The substrates of claim 1, wherein comonomers d) which are present in component A are one or more of the formula (IVa), (IVb) or (IVc).

13. The substrates of claim 1, wherein poly(meth)acrylates of the formula $$CH_2=CHR^{14}COOR^{16} \qquad (VII)$$

in which $R^{14}$ is hydrogen or methyl and $R^{16}$ is $C_1$–$C_4$-alkyl, are employed as component B.

* * * * *